US010558340B2

(12) United States Patent
Pereira et al.

(10) Patent No.: US 10,558,340 B2
(45) Date of Patent: *Feb. 11, 2020

(54) INADVERTENT DISMISSAL PREVENTION FOR GRAPHICAL CONTENT

(71) Applicant: Google LLC, Mountain View, CA (US)

(72) Inventors: Mindy Pereira, Santa Clara, CA (US); Daniel Marc Gatan Shiplacoff, Los Altos, CA (US); Mark Thomas Renouf, Somerville, MA (US); Ned Burns, Cambridge, MA (US)

(73) Assignee: Google LLC, Mountain View, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 15/896,190

(22) Filed: Feb. 14, 2018

(65) Prior Publication Data

US 2018/0173405 A1 Jun. 21, 2018

Related U.S. Application Data

(63) Continuation of application No. 14/660,496, filed on Mar. 17, 2015, now Pat. No. 9,977,578.

(Continued)

(51) Int. Cl.
G06F 3/048 (2013.01)
G06F 3/0484 (2013.01)
(Continued)

(52) U.S. Cl.
CPC ........ *G06F 3/04842* (2013.01); *G06F 3/0483* (2013.01); *G06F 3/0485* (2013.01); *G06F 3/04883* (2013.01)

(58) Field of Classification Search
CPC ............ G06F 3/0482; G06F 17/30899; G06F 3/0481; G06F 17/30705; G06F 17/30772;
(Continued)

(56) References Cited

U.S. PATENT DOCUMENTS 6,295,049 B1 9/2001 Minner
8,059,101 B2 11/2011 Westerman et al.
(Continued)

OTHER PUBLICATIONS

Norman et al., "Gestural Interfaces: A Step Backward in Usability", interactions Sep. + Oct. 2010, pp. 46-49.
(Continued)

*Primary Examiner* — Phuong H Nguyen
(74) *Attorney, Agent, or Firm* — Shumaker & Sieffert, P.A.

(57) ABSTRACT

A computing device includes at least one processor; a display device; and at least one module. The at least one processor may be operable to store data that defines a plurality of discrete graphical elements (DGE's), wherein the plurality of DGE's includes at least one root DGE, and wherein dismissal of the root DGE causes dismissal of all of the plurality of DGE's. The at least one module may be operable to output a particular DGE of the plurality of DGE's; output, for display, the root DGE, responsive to receiving a first indication of user input of a particular input type; and ignore the second indication of user input to refrain from dismissal of the root DGE, responsive to receiving a second indication of user input of the particular input type within a threshold time duration that is initiated responsive to outputting the root DGE.

20 Claims, 5 Drawing Sheets

Related U.S. Application Data

(60) Provisional application No. 62/039,195, filed on Aug. 19, 2014.

(51) Int. Cl.
  *G06F 3/0488* (2013.01)
  *G06F 3/0483* (2013.01)
  *G06F 3/0485* (2013.01)

(58) Field of Classification Search
  CPC .......... G06F 17/3082; G06F 17/30867; G06F 3/017; H04N 19/11
  See application file for complete search history.

(56) References Cited

U.S. PATENT DOCUMENTS

| | | |
|---|---|---|
| 8,719,734 B2 | 5/2014 | Mun et al. |
| 2004/0141011 A1 | 7/2004 | Smethers et al. |
| 2009/0327886 A1* | 12/2009 | Whytock .............. G06F 3/0421 715/702 |
| 2010/0211872 A1* | 8/2010 | Rolston ................. G06F 3/0482 715/702 |
| 2014/0123051 A1 | 5/2014 | Ni |

OTHER PUBLICATIONS

"iPhone App Design: When an Awkward Interface Makes Sense", O'Reilly Media 2014 [online]. Retrieved from the Internet: <http://answers.oreilly.com/topic/2129-iphone-app-design-when-an-awkward-interface-makes-sense/>, 4 pgs.

Roth et al., "Bezel Swipe: Conflict-Free Scrolling and Multiple Selection on Mobile Touch Screen Devices", CHI 2009, Apr. 4-9, 2009, 4 pgs.

U.S. Appl. No. 14/660,495, by Mindy Pereira, filed Mar. 17, 2017.

Notice of Allowance from U.S. Appl. No. 14/660,495, dated Nov. 30, 2017, 19 pp.

* cited by examiner

INADVERTENT DISMISSAL PREVENTION FOR GRAPHICAL CONTENT

RELATED APPLICATION

This application is a continuation of U.S. application Ser. No. 14/660,496, filed Mar. 17, 2015, which claims the benefit of U.S. Provisional Application No. 62/039,195, filed Aug. 19, 2014, the entire contents of each of which are hereby incorporated by reference.

BACKGROUND

Computing devices (e.g., smartphones, tablets, smart watches, activity trackers, heads-up display devices, etc.) may output graphical content for display. For example, a computing device may output a graphical user interface (GUI) that includes one or more graphical elements. Some computing devices allow a user to interact with the GUI using a variety of different inputs, such as single- and multi-touch touch gestures, speech input, pointing devices, and keyboards, to name only a few examples. To change the graphical content of a particular GUI or to navigate through a series of different graphical elements with the GUI, the computing device may receive a sequence of successive indications of user input. For instance, a computing device may receive successive indications of horizontal swipe gestures entered for navigation through and display of different graphical elements. However, in instances where a user rapidly provides a sequence of user inputs of a single type, the user may inadvertently cause the computing device to perform an undesired action if the computing device is configured to perform, based on a current display of graphical elements and a final input from the sequence of inputs, an action different from the action already performed responsive to the prior user inputs from the sequence.

SUMMARY

In some examples, a method includes: storing, by a computing device, data that defines a plurality of discrete graphical elements (DGE's), wherein the computing device is configured to allow, in a user interface and for each respective DGE of the plurality of DGE's, direct navigation from the respective DGE to at least one other respective DGE of the plurality of DGE's, wherein: the plurality of DGE's includes at least one root DGE, and the computing device dismisses every DGE of the plurality of DGE's in response to dismissal of the root DGE; outputting, by the computing device and for display at a display device operatively coupled to the computing device, a particular DGE of the plurality of DGE's; responsive to receiving a first indication of user input of a particular input type that causes the computing device to navigate from the particular DGE to the root DGE, outputting, by the computing device and for display at the display device, the root DGE; and responsive to receiving a second indication of user input of the particular input type within a threshold time duration that is initiated responsive to outputting the root DGE, refraining from dismissing the root DGE.

In some examples, a computing device includes: at least one processor; a display device; and at least one module, operable by the at least one processor to: store data that defines a plurality of discrete graphical elements (DGE's), wherein: the plurality of DGE's includes at least one root DGE, and the computing device dismisses every DGE of the plurality of DGE's in response to dismissal of the root DGE; output for display at the display device operatively coupled to the computing device, a particular DGE of the plurality of DGE's; responsive to receiving a first indication of user input of a particular input type that causes the computing device to navigate from the particular DGE to the root DGE, output for display at the display device, the root DGE; and responsive to receiving a second indication of user input of the particular input type within a threshold time duration that is initiated responsive to outputting the root DGE, refrain from dismissing the root DGE.

In some examples, a non-transitory computer-readable storage medium is encoded with instructions that, when executed, cause at least one processor of a computing device to: store data that defines a plurality of discrete graphical elements (DGE's), wherein the computing device provides, for each respective DGE of the plurality of DGE's, direct navigation from the respective DGE to at least one other respective DGE of the plurality of DGE's, wherein the plurality of DGE's includes at least one root DGE, and wherein the computing device dismisses all of the plurality of DGE's in response to dismissing the root DGE; output for display at the display device operatively coupled to the computing device, a particular DGE of the plurality of DGE's; responsive to receiving a first indication of user input of a particular input type that causes the computing device to navigate from the particular DGE to the root DGE, output for display at the display device, the root DGE; and responsive to receiving a second indication of user input of the particular input type within a threshold time duration that is initiated responsive to outputting the root DGE, refrain from dismissing the root DGE.

The details of one or more examples are set forth in the accompanying drawings and the description below. Other features, objects, and advantages of the disclosure will be apparent from the description and drawings, and from the claims.

DETAILED DESCRIPTION

Figure 1:
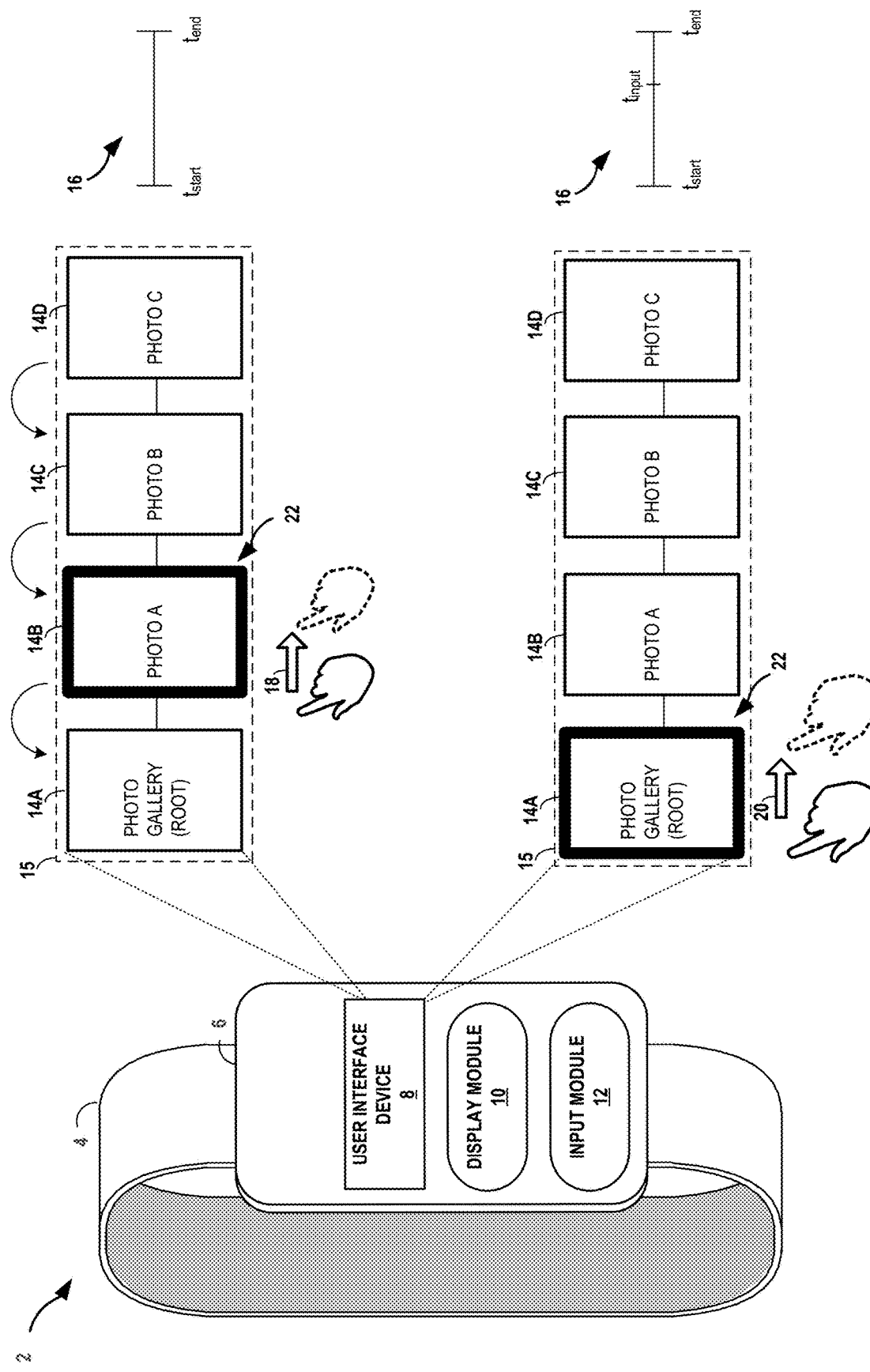
FIG. 1 is a conceptual diagram illustrating an example computing device that implements techniques for preventing accidental dismissal of discrete graphical elements that are output for display, in accordance with one or more aspects of the present disclosure.

In general, this disclosure is directed to techniques for preventing accidental dismissal of discrete graphical elements that are output for display by a computing device. A discrete graphical element may include some information, and the computing device may store and/or output for display members of multiple, different groups of discrete graphical elements. For instance, a computing device may maintain a first group of discrete graphical elements, each of which corresponds to a different photo in a photo gallery, and a second, different group of discrete graphical elements, each of which corresponds to a different song in a music playlist. A group of discrete graphical elements may include a root discrete graphical element that operates as the origin or initial starting point for navigation to other discrete graphical elements in the same group. When the computing device dismisses the root discrete graphical element in response to an indication of user input, the computing device may also dismiss all other discrete graphical elements in the same group.

A computing device may provide for navigation within a group of discrete graphical elements and also between different groups of discrete graphical elements, in response to receiving indications of user input. For instance, the computing device may change the particular discrete graphical element that is presently output for display in response to an indication of user input of a particular type, such as a horizontal swipe gesture. In this way, the user may navigate through multiple discrete graphical elements in a group, such as by performing multiple, horizontal swipe gestures to display different photos in a photo gallery.

To prevent a user from accidentally dismissing the root discrete graphical element (e.g., if the user has performed a rapid sequence of successive user inputs of a particular input type, such as performing a series of rapid horizontal swipes to navigate through a series of photos back to the root discrete graphical element of a photo gallery), the computing device may ignore any indications of user input of the particular type that occur within a threshold time duration that is initiated responsive to displaying the root discrete graphical element. That is, rather than dismissing the root discrete graphical element in response to an indication of user input of the particular type that occurs after navigating to the root discrete graphical element, the computing device may ignore the user input if it occurs within the threshold time duration. In this way, if a user rapidly navigates through a number of discrete graphical elements to the root discrete graphical element, implementations according to the disclosure will prevent the user from accidentally dismissing the root discrete graphical element, and thereby prevent dismissal of all of the discrete graphical elements in the same group. Techniques of the disclosure may therefore improve the functioning of the computing device by preventing accidental dismissal of discrete graphical elements, which may improve battery life by performing fewer operations and/or reduce wear-and-tear on the computing device by eliminating unnecessary user interactions that would otherwise occur as a result of an accidental dismissal of discrete graphical elements.

FIG. 1 is a conceptual diagram illustrating computing device 6 that implements techniques for preventing accidental dismissal of discrete graphical elements that are output for display, in accordance with one or more aspects of the present disclosure. Techniques of the disclosure may be implemented in any computing device that can output discrete graphical elements. Examples of computing device 6 may include a tablet computer, mobile phone, personal digital assistant (PDA), game system or controller, media player, e-book reader, television platform, navigation system, remote control, to name only a few examples. In FIG. 1, computing device 6 is included in wearable 2, which may be a computerized watch.

As shown in FIG. 1, in some examples, wearable 2 may include attachment device 4 and computing device 6. Computing device 6 of wearable 2 includes a combination of hardware, software, firmware, and/or other electrical components of wearable 2. For example, FIG. 1 shows that computing device 6 may include a user interface device (UID) 8, display module 10 and input module 12. In some examples, computing device 6 includes a housing to mount, arrangement, and protect the various components included within computing device 6.

Attachment device 4 may include a physical portion of a wearable computing device that comes in contact with a body (e.g., tissue, muscle, skin, hair, clothing) of a user when the user is wearing wearable 2. For example, in cases where wearable 2 is a watch, attachment device 4 may be a watch band that fits around a user's wrist and comes in contact with the skin of the user. In examples where wearable 2 is eyewear or headwear, attachment device 4 may be a portion of the frame of the eyewear or headwear that fits around a user's head, and when wearable 2 is a glove, attachment device 4 may be the material of the glove that conforms to the fingers and hand of the user. In some examples, wearable 2 can be grasped and held from computing device 6 and/or attachment device 4.

UID 8 of wearable 2 may provide input and/or output functionality. UID 8 may be implemented using one or more various technologies. For instance, UID 8 may function as input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 8 may function as output (e.g., display) device using any one or more display devices, such as a liquid crystal display (LCD), a dot matrix display, a light emitting diode (LED) display, an organic light-emitting diode (OLED) display, e-ink, or similar monochrome or color displays capable of outputting visible information to a user.

In some examples, UID 8 may include be a presence-sensitive display that may include a display device and receive tactile input from a user of wearable 2. UID 8 may receive indications of tactile input by detecting one or more gestures from a user (e.g., the user touching or pointing to one or more locations of UID 8 with a finger or a stylus pen). UID 8 may present output to a user. UID 8 may present the output as a discrete graphical element.

Display module 10 and input module 12 may perform operations described herein using software, hardware, firmware, or a mixture of hardware, software, and/or firmware residing in and/or executing at wearable 2. Computing device 6 may execute modules 10 and 12 with one or more processors located within computing device 6. In some examples, computing device 6 may execute 10 and 12 as one or more virtual machines executing on underlying hardware within computing device 6. Modules 10 and 12 may execute as one or more services or components of operating systems or computing platforms of computing device 6. Modules 10 and 12 may execute as one or more executable programs at application layers of computing platforms of computing device 6. In some examples, one or more of UID 8 and modules 10 and 12 may be arranged separately from, e.g., remotely to, computing device 6 via interaction by computing device 6 with one or more network services operating at a network or in a network cloud.

Computing device 6 may include input module 12, as shown in FIG. 1. Input module 12 may receive touch event data from user interface device 8 as user input is performed at user interface device 8. As user interface device 8 detects user input at different locations of user interface device 8, user interface device 8 may send touch event data to input module 12. In some examples, the touch event data may indicate a location of the user input at user interface device, the time that the user input was detected, and the type of user input (e.g., touch down, touch up), to name only a few examples. Input module 12 may receive one or more touch events that correspond to single- and multi-touch gestures performed at user interface device 8.

In some examples, input module 12 may determine different types of user input based on one or more touch events. A type of user input may be identifiable by one or more characteristics of the user input. Characteristics of the gesture may include but are not limited to: speed, direction, continuity, acceleration, curvature, duration, interval or spacing between touch events (e.g., time between single- and/or multi-touch gesture), time at which user input occurred, to name only a few examples. Input module 12 may determine or more characteristics of a user input based on touch event data received from user interface device 8. Based on the touch event data, input module 12 may determine a type of the user input according to one or more characteristics that correspond to the touch event data.

Different input types may be identifiable by different numbers of characteristics. For instance, an input type may be a horizontal swipe gesture that includes a continuous movement of a finger or other input unit across user interface device 8 along a horizontal path that is parallel to a horizontal axis of user interface device 8. In another example, an input type may be a horizontal, leftward swipe gesture, which may be a horizontal swipe gesture as previously described, but in a leftward direction toward a left edge of user interface device 8. In still another example, a swipe gesture may be a continuous movement of a finger or other input unit across user interface device 8. A non-exhaustive list of single- and multi-touch gestures includes: tap, double-tap, flick, drag, pinch open, pinch close, touch and hold, two-finger scroll, pan, to name only a few examples.

Input module 12 may map different types of user inputs to different operations. For instance, a horizontal swipe user input from right to left may cause computing device 6 to perform a rightward navigation operation that changes a currently displayed discrete graphical element to a next discrete graphical element that follows the currently displayed discrete graphical element in logical order. Conversely, a horizontal swipe user input from left to right may cause computing device 6 to perform a leftward navigation operation that changes a currently displayed discrete graphical element to a previous discrete graphical element that follows the currently displayed discrete graphical screen in logical order.

In some examples, a specific type of user input may perform a different operation depending on the current context of the computing device. The current context of the computing device may include a specific state of the device. For instance, if the computing device is outputting a non-root discrete graphical element, that may be a context that is different than the computing device outputting a root discrete graphical element. The operation for a particular input type if the computing device is outputting a non-root discrete graphical element may be different than an operation for the particular input type of the computing device is outputting a root discrete graphical element. For example, a horizontal swipe user input from left to right, if a non-root discrete graphical element is currently displayed, may cause computing device 6 to perform a leftward navigation operation that changes a currently displayed discrete graphical element to a previous discrete graphical element that precedes the currently displayed discrete graphical element in logical order. For instance, the horizontal swipe gesture "pulls" the previous discrete graphical element into view and removes the currently displayed discrete graphical element from display.

However, in a different context, e.g., if a root discrete graphical element is currently display, a horizontal swipe user input from left to right may cause computing device 6 to dismiss all of the discrete graphical elements in a group that includes the root discrete graphical element. As an example, a user input of a particular input type may causes computing device 6 to navigate from a currently displayed discrete graphical element to another discrete graphical element within the same group of discrete graphical elements, if the currently displayed discrete graphical element is not the root discrete graphical element, but a user input of the particular input type may cause computing device 6 to dismiss the root discrete graphical element, if the currently displayed discrete graphical element is the root discrete graphical element and the user input of the particular input type is not received by the computing device within a threshold time duration, as further described below.

Computing device 6 may also include display module 10. Display module 10 may control graphical content displayed at user interface device 8. For instance, display module 10 may store data that defines individual discrete graphical elements and groups of discrete graphical elements. The data that defines the discrete graphical elements may include information displayed in each discrete graphical element (e.g., text and images) and the dimensions of the discrete graphical element to name only a few properties of such individual discrete graphical elements. Display module 10 may also store data that defines groups of discrete graphical elements. Such data may include a list, map, table, array, or any other suitable container or collection data structure to store multiple discrete graphical elements.

As described above, a discrete graphical element may be, a GUI or a portion of a GUI, which includes some information. In some examples, a discrete graphical element may fill the entire physical display area of user interface device 8. For instance, as shown in FIG. 1, at any particular point in time, user interface device 8 outputs for display a single discrete graphical element fills the entire physical display of user interface device 8. In other examples, a discrete graphical element may fill less than all of the entire physical display area of user interface device 8 (e.g., discrete graphical elements may be visual "cards"). For instance, multiple discrete graphical elements may be output for display in the entire physical display area of user interface device 8. In such examples, only a portion of one or more of the multiple discrete graphical elements may be output for display. A discrete graphical element may include some information. Examples of such information may be based on, but are not limited to: phone calls, emails, text messages, instant messages, fitness activities, sports, weather, videos, photos, social networking, finance, news, entertainment, games, to name only a few examples. Each discrete graphical element may be associated functionality of computing platforms, operating systems, applications, and/or services executing at or accessible by computing device 6. A user may provide user input to interact with discrete graphical elements that are presented at UID 8 to cause computing device 2 perform operations based on the user input. Interactions with the discrete graphical elements may include navigating between other discrete graphical elements, dismissing discrete graphical elements, providing user input that is sent to other computing devices (e.g., inputting text, providing a user selection, etc.), to name only a few examples.

FIG. 1 illustrates a group of discrete graphical elements 15 that include discrete graphical elements 14A-14D. Display module 10 may store and/or maintain access to data that defines the group of discrete graphical elements 15 and each of discrete graphical elements 14A-14D. In the example of FIG. 1, group of discrete graphical elements 15 correspond to a photo gallery. Group of discrete graphical elements 15 may include a root discrete graphical element 14A and one or more non-root discrete graphical elements 14B-14D. A group of discrete graphical elements may be one or more discrete graphical elements that are associated with the root discrete graphical element in the group and/or at least one or other discrete graphical element in the group. In some examples, a group of discrete graphical elements may correspond to an application executing at computing device 6 or remote to computing device 6.

As described above, root discrete graphical element 14A operates as the origin or initial starting point for navigation to other discrete graphical elements 14B-14D in the same group. Root discrete graphical element 14A may be, but is not limited to, the natural beginning, the logical beginning, the first, the most recent, or the summary, for other non-root discrete graphical elements 14B-14D in group 15. In the example of FIG. 1, root discrete graphical element 14A may be a summary screen for the photo gallery that indicates summary information, such as the total number of pictures in the gallery, the location of photos in the gallery, the date and/or time of the photos in the gallery, whether the photos in the gallery are shared with others, to name only a few examples. If a user provides user input to launch the photo gallery while the photo gallery is not currently launched, display module 20 may cause user interface device 8 to display root discrete graphical element 14A initially, from which the user can then navigate to other discrete graphical elements.

As shown in FIG. 1, the group of discrete graphical elements 15 may include one or more non-root discrete graphical elements 14B-14D. A non-root discrete graphical element is a discrete graphical element that does not operate as a root discrete graphical element. In other words, a non-root discrete graphical element may be any other discrete graphical element in a group that is not a root discrete graphical element. Non-root discrete graphical elements may include information that is more detailed than the root discrete graphical element or that is different information than the information included in the root discrete graphical element. For example, while root discrete graphical element 14A may include a summary of information relating to the photo gallery, non-root discrete graphical elements may include actual photo information that is a representation of a photo included in the gallery. In some examples, a root discrete graphical element may have a parent relationship to a non-root discrete graphical element. Information included in each discrete graphical element of a group of discrete graphical elements may have some relationship to the root discrete graphical element in the same group of discrete graphical elements. For example, a root discrete graphical element for weather may include a summary of weather conditions, and non-root discrete graphical elements in the same group may include other weather information.

In some examples, display module 10 may impose an ordering on discrete graphical elements 14 included in the group of discrete graphical elements 15. For instance, root discrete graphical element 14A may be ordered with a lowest ordering value, wherein display module 10 may determine the lowest ordering value is the beginning or first discrete graphical element in the group of discrete graphical elements 15. Each of discrete graphical elements 14B-14D may have a successively higher ordering value that is greater than its immediate predecessor discrete graphical element, if discrete graphical elements 14A-14D are linearly arranged from discrete graphical element 14A to discrete graphical element 14D. While described as a linear arrangement for example purposes, non-linear arrangements are also possible and within the scope of this disclosure.

In some examples, display module 10 may maintain data that associates each discrete graphical element to one or more discrete graphical elements. For instance, each discrete graphical element, and/or the data that represents the group of discrete graphical elements, may include pointers to other discrete graphical elements that establish an association between at least two discrete graphical elements. As an example, in FIG. 1, display module 10 may store data indicating an association between root discrete graphical element 14A and non-root discrete graphical element 14B. Display module 10 may similarly store data indicating respective associations between discrete graphical elements 14B and 14C, and between discrete graphical elements 14C and 14D. In this way, if a user provides a user input and input module 12 determines an operation to perform, display module 10 may determine the association between at least two discrete graphical elements for the operation and perform the operation for the user input accordingly. For instance, responsive to receiving a user input to navigate to a successor discrete graphical element that is a successor to the currently displayed discrete graphical element, display module 10 may determine an association between the currently displayed discrete graphical element and the successor discrete graphical element, and may cause user interface device 8 to display the successor discrete graphical element. Display module 10 and input module 12 may therefore allow the user to navigate between different discrete graphical elements using, at least in part, associations between discrete graphical elements maintained and/or accessed by the modules.

Although FIG. 1 illustrates a single group of discrete graphical elements 15, display module 10 may store and maintain access to data for any number of groups of discrete graphical elements. Display module 10 may concurrently maintain data for multiple different groups of discrete graphical elements, such that a user may navigate between discrete graphical elements within a group (e.g., between discrete graphical elements 14A-14D in group 15), and the user may navigate between different groups of discrete graphical elements (e.g., from a first discrete graphical element in a first group of discrete graphical elements to a second discrete graphical element in a second group of discrete graphical elements). For instance, if display module 10 maintains two groups of discrete graphical elements, a horizontal swipe gesture may cause display module 10 to navigate from one discrete graphical element to another discrete graphical element in the same group of discrete graphical elements. A vertical swipe gesture may cause display module 10 to navigate from a discrete graphical element of the first group of discrete graphical elements to a discrete graphical element (e.g., root) of the second group of discrete graphical elements.

As described in this disclosure computing device 6 may allow a user to navigate between different discrete graphical elements. Navigation from a first discrete graphical element that is currently displayed to a second discrete graphical element may include input module 12 receiving an indication of user input and, based on the user input, display module 10 causing user interface device 8 to display the second discrete graphical element that is different than a first discrete graphical element. In other words, navigation from the first discrete graphical element to the second discrete graphical element may include changing the currently outputted discrete graphical element from the first to the second discrete graphical element. In some examples, the first discrete graphical element is replaced by the second discrete graphical element at user interface device 8 as a part of the navigation. When a user navigates from a first discrete graphical element to a second discrete graphical element, display module 10 may continue to maintain the state of the first discrete graphical element, such that although the first discrete graphical element is no longer output for display, display module 10 may later display the first discrete graphical element by re-using the state information of the first discrete graphical element rather than re-instantiating or otherwise re-creating the discrete graphical element. Stated another way, although navigation may cause a discrete graphical element to no longer be output for display at user interface device 8, the discrete graphical element may not be programmatically destroyed (e.g., one or more objects representing the discrete graphical element is not dereferenced and/or deallocated). In this way, navigating from a first discrete graphical element to a second discrete graphical element causes computing device 6 to maintain data that represents a state of the first discrete graphical element and remove the first DGE from display.

Computing device 6 may also allow a user to dismiss one or more discrete graphical elements. Dismissing a discrete graphical element may cause display module 10 to programmatically destroy the discrete graphical element. For instance, display module 10 may dereference and/or deallocate one or more objects that define the discrete graphical element. Unlike navigation, if computing device 6 dismisses a discrete graphical element, display module 10 my re-instantiate or otherwise re-create the discrete graphical element in order to output it for display at a later time.

As further described now with respect to FIG. 1, to prevent a user from accidentally dismissing root discrete graphical element 14A if the user has performed a rapid sequence of successive user inputs of a particular input type (e.g., performing a series of rapid horizontal swipes to navigate through a series of photos back to the root discrete graphical element of a photo gallery), input module 12 may ignore any indications of user input of the particular type that occur within a threshold time duration that is initiated responsive to displaying the 14A root discrete graphical element. That is, rather than dismissing root discrete graphical element 14A in response to an indication of user input of the particular type that occurs after navigating to root discrete graphical element 14A, input module 12 may ignore the user input if it occurs within the threshold time duration. In this way, if a user rapidly navigates through discrete graphical elements 14B-14B to root discrete graphical element 14A, techniques of the disclosure will prevent the user from accidentally dismissing root discrete graphical element 14A, and thereby prevent dismissal of all of the discrete graphical elements in the group of discrete graphical elements 15.

In operation, as described above, display module 10 may store data that defines discrete graphical elements 14. Each of discrete graphical elements 14 can be directly navigated to from at least one other discrete graphical element of discrete graphical elements 14. A first discrete graphical element can be directly navigated to from a second discrete graphical element if a single user input causes navigation from the second discrete graphical element to the first discrete graphical element. In the example of FIG. 1, a user may cause display module 10 to directly navigate from discrete graphical element 14D to discrete graphical element 14C in response to a rightward horizontal swipe that begins at a first location of user interface device 8 that is to the left of a second location of user interface device 8 and traverses from left to right across under interface device 8. Discrete graphical elements 14 include at least one root discrete graphical element 14A, and dismissal of root discrete graphical element 14A causes dismissal of all of discrete graphical elements 14A-14D in the group of discrete graphical elements 15.

In the example of FIG. 1, a horizontal swipe gesture in either direction, while a non-root discrete graphical element is currently displayed, causes display module 10 to navigate to a different discrete graphical element. In the example of FIG. 1, a leftward horizontal swipe gesture, while root discrete graphical element 14A is currently displayed, causes display module 10 to navigate to discrete graphical element 14B. In the example of FIG. 1, a rightward horizontal swipe gesture, while root discrete graphical element 14A is currently displayed, causes display module 10 dismiss root discrete graphical element 14A and all of the discrete graphical elements 14B-14D in the group of discrete graphical elements 15.

Display module 10 may cause user interface device 8 to output for display, a particular discrete graphical element 22 of discrete graphical elements 14. In some examples, the particular discrete graphical element 22 may be referred to as the current discrete graphical element or currently displayed discrete graphical element. A user may perform a user input 18 at user interface device 8. Input module 12 may receive data from user interface device 8 that corresponds to the user input, and determine that the user input is of a particular input type. In the example of FIG. 1, the particular input type may be a rightward horizontal swipe gesture.

Input module 12 may send data to display module 10 that indicates the user input, and the particular input type. Display module 10 may determine the current context of computing device 6, in order to determine the operation to perform. In the current example, display module 10 determines that discrete graphical element 14B, which is the currently displayed discrete graphical element, is not a root discrete graphical element. Because discrete graphical element 14B is not a root discrete graphical element, rather than dismissing the root discrete graphical element, display module 10 navigates to discrete graphical element 14A, such that discrete graphical element 14B is no longer displayed and discrete graphical element 14A is displayed. In other words, responsive to receiving the indication of user input 18 of the particular input type that causes navigation from the particular discrete graphical element 22 (e.g., discrete graphical element 14B) to the root discrete graphical element 14A, display module 10 may cause user interface device 8 to output root discrete graphical element 14A.

In the example of FIG. 1, the user may have performed a series of rapid rightward horizontal swipe gestures to navigate from discrete graphical elements 14D to 14C, 14C to 14B, and 14B to 14A, at which point root discrete graphical element 14A is now the currently displayed discrete graphical element 22. To prevent the user from accidentally dismissing root discrete graphical element 14A if the user has performed a successive rightward horizontal swipe gesture while root discrete graphical element 14 is displayed, input module 12 may initiate a timer of a threshold time duration 16. That is, input module 12 may, responsive to outputting for display root discrete graphical element 14A, start a timer that includes a start time and an end time. Threshold time duration 16 may be a user-defined value or may be a system-defined value that is hardcoded by the application developer of display module 10. In some examples, threshold time duration 16 may be automatically adjusted based on learning user's input habits based on past user inputs. In some examples, threshold time duration 16 may be 50 milliseconds. In some examples, threshold time duration 16 may be 100 milliseconds. In some examples, threshold time duration 16 may be 500 milliseconds. In some examples, threshold time duration 16 may be any duration within a range of 1-500 milliseconds.

In any case, the start time $t_{start}$ of threshold time duration 16 may occur when root discrete graphical element 14A is displayed. The end time $t_{end}$ of threshold time duration 16 may be a time defined by the sum of the start time and the value representing threshold time duration 16. In some examples, the timer may be a countdown timer in which case $t_{start}$ is the initial value representing threshold time duration 16 and $t_{end}$ is zero. In some examples, $t_{start}$ may be a current time (e.g., a system time, formatted time such as DD:MM:YYYY MM:SS) at which root discrete graphical element 14A is displayed responsive to navigating from discrete graphical element 14B. $t_{end}$, in this example, may be a time (e.g., a system time, formatted time such as DD:MM:YYYY MM:SS) that is the sum of the start time and the value representing threshold time duration 16. In other words, the threshold time duration is equal to a difference of time between the start time and the end time.

To prevent the user from accidentally dismissing root discrete graphical element 14A, input module 12 ignore any indications of user input of the particular type that occur within threshold time duration 16 (e.g., before timer for threshold time duration 16 expires) that is initiated responsive to displaying the 14A root discrete graphical element. For instance, responsive to receiving indication of user input 20 of the particular input type (e.g., a rightward horizontal swipe gesture) at time $t_{input}$ that is within threshold time duration 16 and while root discrete graphical element 14A display at user interface device 8, input module 12 may ignore user input 20. In this way, if the user rapidly navigates through discrete graphical elements 14D-14B to root discrete graphical element 14A, input module 12 will prevent the user from accidentally dismissing root discrete graphical element 14A, and thereby prevent dismissal of all of the discrete graphical elements the group of discrete graphical elements 15. In other words, input module 12 ignores the indication of user input 20 in order to refrain from dismissing root discrete graphical element 14A and therefore all of the discrete graphical elements the group of discrete graphical elements 15. As further described in FIG. 4, input module 12 may also determine whether to refrain from dismissing root discrete graphical element 14A based on one or more characteristics of the gesture, such as velocity, continuity (e.g., a continuous amount of velocity over a threshold distance and or a continuous direction over a threshold distance), acceleration, and length (e.g., distance traveled by gesture), to name only a few examples. By refraining from dismissing root discrete graphical element 14A, display module 10 may continue to display discrete graphical element 14A, although input module 12 received the indication of user input 20. In some examples, display module 10, as a part of refraining from dismissing root discrete graphical element 14A, may apply one or more visual effects to discrete graphical element 14A. For instance, display module 10 may cause discrete graphical element 14A to animate with a stretching, bouncing, or sliding effect, to name only a few examples.

If the user performs a user input of the particular input type at user interface device 8 that is after $t_{end}$ (e.g., outside of threshold time duration 16 or not within threshold time duration 16), display module 10 may dismiss root discrete graphical element 14A including all of the discrete graphical elements 14B-14D included within the group of discrete graphical elements 15. In some examples, the user may perform a user input of the particular input type at user interface device 8 that is outside of threshold time duration 16 or not within threshold time duration 16 without receiving a prior indication of user input that is ignored by input module 12 (e.g., the first user input received after discrete graphical element 14A is displayed is after $t_{end}$). In some examples, the user may perform multiple user inputs of the particular input type at user interface device 8 that during threshold time duration 16, which are each ignored by input module 12. Techniques of the disclosure may therefore improve the functioning of computing device 6 by preventing accidental dismissal of discrete graphical elements, which may improve battery life by performing fewer operations and/or reduce wear-and-tear on computing device 6 by eliminating unnecessary user interactions that would otherwise occur as a result of an accidental dismissal of discrete graphical elements.

Figure 2:
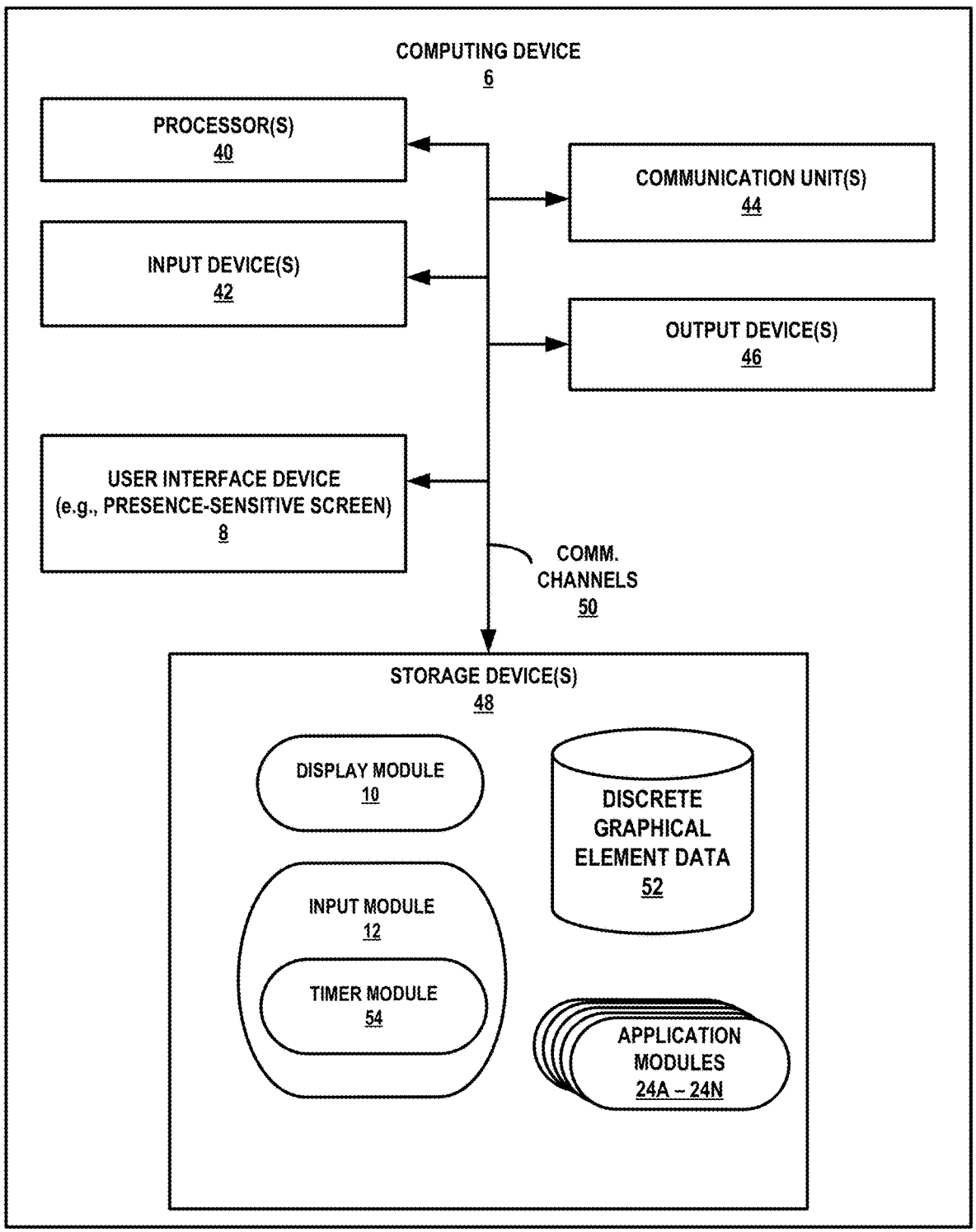
FIG. 2 is a block diagram illustrating an example computing device that implements techniques for preventing accidental dismissal of discrete graphical elements that are output for display, in accordance with one or more aspects of the present disclosure.

FIG. 2 is a block diagram illustrating an example computing device that implements techniques for preventing accidental dismissal of discrete graphical elements that are output for display, in accordance with one or more aspects of the present disclosure. Computing device 6 of FIG. 2 is described below within the context of FIG. 1. FIG. 2 illustrates only one particular example of computing device 6, and many other examples of computing device 6 may be used in other instances and may include a subset of the components included in example computing device 6 or may include additional components not shown in FIG. 2.

As shown in the example of FIG. 2, computing device 6 includes UID 12, one or more processors 40, one or more input devices 42, one or more communication units 44, one or more output devices 46, and one or more storage devices 48. Storage devices 48 of computing device 6 include display module 10, input module 12, and application modules 24A-24N (collectively referred to as "application modules 24"). Communication channels 50 may interconnect each of the components 8, 10, 12, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 6 may receive input. Examples of input are tactile, audio, video, and sensor input. Input devices 42 of computing device 6, in some examples, include a presence-sensitive input device, mouse, keyboard, voice responsive system, video camera, microphone, or any other type of device for detecting input from a human or machine. In some examples, input devices 42 include physiological sensors for obtaining physiological parameter information associated with a user of computing device 6. For example, input devices 42 may include a heart monitor sensor, a temperature sensor, a galvanic skin response sensor, an accelerometer, a gyroscope, a pressure sensor, a blood pressure sensor, and/or any other sensor for measuring a physiological parameter that computing device 6 may use for determining a physiological condition of a user.

One or more output devices 46 of computing device 6 may generate output. Examples of output are tactile, audio, and video output. Output devices 46 of computing device 6, in some examples, include a sound card, video graphics adapter card, speaker, cathode ray tube (CRT) monitor, liquid crystal display (LCD), or any other type of device for generating output to a human or machine.

One or more communication units 44 of computing device 6 may communicate with external devices via one or more networks by transmitting and/or receiving network signals on the one or more networks. For example, computing device 6 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 6 may include functionality of input devices 42 and/or output devices 46. In the example of FIG. 2, UID 12 may be or may include a presence-sensitive input device. In some examples, a presence-sensitive input device may detect an object at and/or near the presence-sensitive input device. As one example range, a presence-sensitive input device may detect an object, such as a finger or stylus that is within two inches or less of the presence-sensitive input device. In another example range, a presence-sensitive input device may detect an object six inches or less from the presence-sensitive input device, and other ranges are also possible. The presence-sensitive input device may determine a location (e.g., an (x,y) coordinate) of the presence-sensitive input device at which the object was detected. The presence-sensitive input device may determine the location selected by the input device using capacitive, inductive, and/or optical recognition techniques. In some examples, presence-sensitive input device provides output to a user using tactile, audio, or video stimuli as described with respect to output device 46.

While illustrated as an internal component of computing device 6, UID 12 also represents an external component that shares a data path with computing device 6 for transmitting and/or receiving input and output. For instance, in one example, UID 12 represents a built-in component of computing device 6 located within and physically connected to the external packaging of computing device 6. In another example, UID 12 represents an external component of computing device 6 located outside and physically separated from the packaging of computing device 6 (e.g., a monitor, a projector, etc. that shares a wired and/or wireless data path with computing device 6).

One or more storage devices 48 within computing device 6 may store information for processing during operation of computing device 6. In some examples, storage device 48 is a temporary memory, meaning that a primary purpose of storage device 48 is not long-term storage. Storage devices 48 on computing device 6 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage mediums. Storage devices 48 may be configured to store larger amounts of information than a temporary memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 10, 12, and 24.

One or more processors 40 may implement functionality and/or execute instructions within computing device 6. For example, processors 40 on computing device 6 may receive and execute instructions stored by storage devices 48 that execute the functionality of modules 10, 12, and 24. These instructions executed by processors 40 may cause computing device 6 to store information within storage devices 48 during program execution. Processors 40 may execute instructions of modules 10, 12, and 24 to cause UID 12 to present discrete graphical elements. That is, modules 10, 12, and 24 may be operable by processors 40 to perform various actions, including displaying a visual stack of content cards in response to movement associated with computing device 6.

One or more application modules 24 may provide graphical information and instructions to display module 10 that display module 10 includes as content or information contained in a graphical representation of discrete graphical elements. For example, application module 24A may be a messaging application that executes at computing device 6 to provide computing device 6 with access to a messaging service. Application module 24A may obtain information (e.g., via a network) that includes content of a message received by a messaging account associated with computing device 6. Application module 24A may provide the content of the message (e.g., textual information) as well as instructions to display module 10 for causing UID 8 to present one or more discrete graphical elements for display at UID 12. Application modules 24B-24N may likewise each provide respective information and instructions to display module 10 that cause UID 8 to present the content associated with each of content cards 16.

In accordance with techniques of this disclosure, display module 10 may store discrete graphical element data 52 that defines discrete graphical elements 14. Using discrete graphical element data 52, display module 10 may cause user interface device 8 to output for display, a particular discrete graphical element 22 of discrete graphical elements 14, as illustrated in FIG. 1. A user may perform a user input 18 at user interface device 8. Input module 12 may receive data from user interface device 8 that corresponds to the user input, and determine that the user input is of a particular input type. The particular input type may be a rightward horizontal swipe gesture.

Input module 12, as shown in FIG. 2, may send data to display module 10 that indicates the user input, and the particular input type. Display module 10 determines that discrete graphical element 14B, as shown in FIG. 1, which is the currently displayed discrete graphical element, is not a root discrete graphical element. In response to the user input, display module 10 navigates to discrete graphical element 14A, such that discrete graphical element 14B is no longer displayed and discrete graphical element 14A is displayed.

To prevent the user from accidentally dismissing root discrete graphical element 14A if the user has performed a successive rightward horizontal swipe gesture while root discrete graphical element 14 is displayed, timer module 54 of input module 12 may initiate a timer of a particular threshold time duration. The start time of threshold time duration 16 may occur when root discrete graphical element 14A is displayed. In some examples, the start time of threshold time duration 16 may occur responsive to the user input completing that causes discrete graphical element 14A to be displayed. Time module 54 may define the end time of the particular threshold time duration may be a time defined by the sum of the start time and the particular value representing the threshold time duration.

While the threshold time duration has not expired, input module 12 may ignore any indications of user input of the particular type that occur within the particular threshold time duration. Responsive to receiving an indication of user input of the particular input type that is within the particular threshold time duration 16 and while root discrete graphical element 14A display at user interface device 8, input module 12 may ignore user input 20. In this way, if the user rapidly navigates through discrete graphical elements 14D-14B to root discrete graphical element 14A, input module 12 will prevent the user from accidentally dismissing root discrete graphical element 14A, and thereby prevent dismissal of all of the discrete graphical elements the group of discrete graphical elements 15. At a later time, if the user performs a user input of the particular input type at user interface device 8 that is after the expiration of the particular threshold time duration, display module 10 may dismiss root discrete graphical element 14A including all of the discrete graphical elements 14B-14D included within the group of discrete graphical elements 15, as shown in FIG. 1.

Although described with respect to user inputs as gestures provided at a user interface device in FIGS. 1-2, techniques of the disclosure may also be implemented with physical buttons, graphical buttons, directional pads, touch pads, and audio inputs to name only a few examples. That is, techniques of the disclosure may be applied when computing device 6 receives a group of user inputs (e.g., button taps or speech input) that cause navigation between and dismissal of different instances of graphical content as similarly described with respect to discrete graphical elements in FIGS. 1-2. For instance, computing device may apply the techniques described in FIGS. 1-2 in a similar manner to a sequence of button presses and/or a sequence of speech inputs to determine whether to ignore one or more user inputs in order to prevent accidental dismissal of graphical content.

Although described in FIGS. 1-2 with respect to navigation between discrete graphical elements of a particular group, the techniques may also be applied navigation between different groups of discrete graphical elements. For instance, if computing device 6 maintains multiple groups of discrete graphical elements, the user may provide vertical swipe gestures at user interface device 8 to navigate between the different groups. If a discrete graphical element is displayed in a first group of discrete graphical elements of a plurality of groups, and the user performs a vertical swipe gesture to navigate to a previous group, which in the current case there is no group prior to the first group, computing device 6 may perform some operation other than navigating to another group of discrete graphical elements. For instance, the operation may include powering off computing device 6, toggling the muting of the volume of computing device 6, toggling "do not disturb" functionality to prevent notification output at computing device 6, putting computing device 6 into a sleep state to name only a few examples.

To prevent the user from inadvertently or accidentally performing the operation other than navigating to another group of discrete graphical elements when the discrete graphical element is displayed in the first group of discrete graphical elements of the plurality of groups, and the user performs the vertical swipe gesture to navigate to a previous group, computing device 6 may apply the techniques of FIGS. 1-2 in similar manner. For instance, responsive to navigating from a previous discrete graphical element of a previous group of discrete graphical elements to a discrete graphical element of the first group of discrete graphical elements, computing device 6 may start a timer of a threshold time duration. If computing device 6 receives a subsequent indication of user input of the vertical swipe type of input within the threshold time duration, computing device 6 may ignore the indication of user input. If, however, computing device 6 receives the subsequent indication of user input after the threshold time duration expires (e.g., outside of the threshold time duration), computing device may perform the other operation, such as powering off computing device 6, toggling the muting of the volume of computing device 6, putting computing device 6 into a sleep state to name only a few examples.

In some examples, computing device 6 may determine whether to ignore an indication of user input based at least in part on a quantity of indications of user input received by computing device 6. If the quantity of indications of user input does not satisfy a threshold quantity, computing device 6 may not ignore an indication of user input. For instance, if the quantity of indications of user input does not satisfy a threshold quantity, computing device 6 may not ignore an indication of user input, although the indication of user input is received within a threshold time duration. As an example, computing device 6 may determining a quantity of user inputs received by computing device 6. Computing device 6 may determine whether the quantity of user inputs satisfies a threshold quantity. Computing device 6 may ignore the indication of user input to refrain from dismissal of the root discrete graphical element responsive to determining that the quantity of user inputs satisfies threshold quantity. Computing device 6 may not ignore the indication of user input to refrain from dismissal of the root discrete graphical element if computing device 6 determines that the quantity of user inputs does not satisfy threshold quantity, and in such cases, may apply one or more operations associated with the indication of user input.

In some examples, computing device 6 may determine quantity of user inputs for a particular threshold time duration. The particular threshold time duration may be different than the threshold time duration that is started when the root discrete graphical element is output for display. Computing device 6 may determine quantity of user inputs for the particular threshold time duration in order to measure the quantity of user inputs over a particular period of time. That is, computing device 6 may determine whether the quantity of user inputs satisfies a threshold quantity of user inputs within the particular threshold time duration. Computing device 6 may ignore an indication of user input to refrain from dismissal of the root discrete graphical element responsive to determining that the quantity of user inputs satisfies the threshold quantity within the particular threshold time duration. Computing device 6 may not ignore the indication of user input to refrain from dismissal of the root discrete graphical element if computing device 6 determines that the quantity of user inputs does not satisfy threshold quantity within the particular threshold time duration, and in such cases, may apply one or more operations associated with the indication of user input.

In some examples, a first indication of user input of a particular input type may include a first linear gesture in a direction towards a first edge of user interface device 8, and the linear gesture may be substantially parallel to a second edge of user interface device 8 that is orthogonal to the first edge. The first indication of user input may be a horizontal swipe gesture. A second indication of user input of the particular input type may include a second linear gesture in the direction towards the first edge of user interface device 8, the second linear gesture being substantially parallel to the second edge of user interface device 8 that is orthogonal to the first edge. That is the second indication of user input may be a horizontal swipe gesture in the same direction as the first indication of user input. To illustrate a second, different type of user input, a third indication of user input of the second input type may include a third linear gesture in a first direction that is opposite to a second direction towards the first edge of user interface device 8, and the third linear gesture may be substantially parallel to the second edge of user interface device 8 that is orthogonal to the first edge. That is, the third indication of user input may be horizontal swipe gesture in a direction that is opposite to the first and second horizontal swipe gestures.

In some examples, multiple indications of input within the threshold time duration may cause the computing device to dismiss all of a plurality of DGE's. In other words, although the computing device may ignore a first indication of input within the threshold time duration, a subsequently received indication of input within the threshold time duration may indicate the user's intent to dismiss all of the DGE's associated with a particular root DGE. To illustrate, a computing device may, responsive to receiving a first indication of user input of a particular input type that causes the computing device to navigate from the particular DGE to the root DGE, output, for display at the display device, the root DGE. Responsive to receiving a second indication of user input of the particular input type within a threshold time duration that is initiated responsive to outputting the root DGE, the computing device may refrain from dismissing the root DGE. However, a third indication of user input within the threshold time duration, may cause the computing device to dismiss all of the one or more DGE's associated with the root DGE. In this way, the computing device may treat a subsequently received indication of input within the threshold time duration as indicating the user's intent to dismiss all of the DGE's associated with a particular root DGE In some examples, only a single DGE is output for display at a particular time. That is, when the computing device navigates from a first DGE that is currently output for display to a second DGE that is subsequently output for display, the first DGE may be removed from display and the second DGE is then displayed. In some examples, when only a single DGE is output for display at a time, the DGE fills the entire area of the presence-sensitive display. In some examples, when only a single DGE is output for display at a time, the DGE and a menu bar fills an entire area of the presence-sensitive display.

Figure 3:
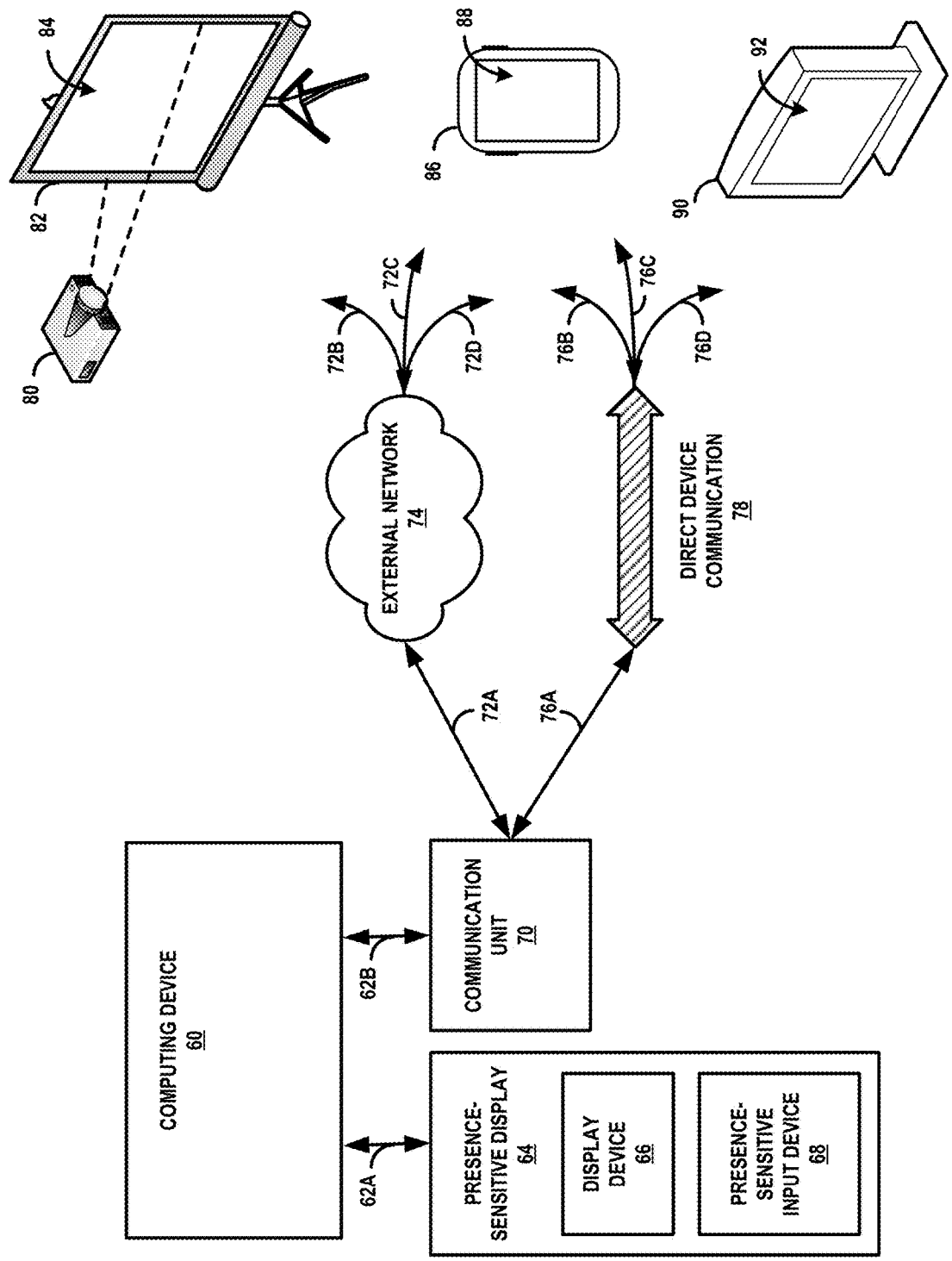
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 60, a presence-sensitive display 64, communication unit 70, projector 80, projector screen 82, mobile device 86, and visual display device 90. In some examples, presence-sensitive display 64 may be a user-interface device, such as UID 8, as described in FIGS. 1-2. Although shown for purposes of example in FIGS. 1 and 2 as a stand-alone computing device 6, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 6 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 64, like UID 8 as shown in FIG. 1, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices (e.g., input devices, output devices, memory, storage devices) that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of presence-sensitive display 4 and/or 64 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of presence-sensitive display 4 and/or 64 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, or 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may store data that defines a plurality of discrete graphical elements (DGE's). Each DGE of the plurality of DGE's may be directly navigated to from at least one other DGE of the plurality of DGE's. The plurality of DGE's may include at least one root DGE, and dismissal of the root DGE may cause dismissal of all of the plurality of DGE's. Computing device 60 may output for display at a display device, a particular DGE of the plurality of DGE's. For instance, computing device 60 may send data, via communication unit 70 and across external network 74, which defines the particular DGE for display at presence-sensitive display 88. In some examples, computing device 6 may receive a first indication of user input of a particular input type at that causes navigation from the particular DGE to the root DGE. For instance, a user may perform a gesture at presence-sensitive input device 88. Mobile device 86 may send data representing the gesture as the first indication of user input, via external network 74 and communication unit 70, to computing device 60 that may process the first indication of user input. Computing device 6, in response to receiving the first indication of user input, may output for display to mobile device 86, data that defines the root DGE. Mobile device 86 may, based on the data, output for display the root DGE.

Computing device 6 may receive a second indication of user input of the particular input type. For instance, a user may perform a gesture at presence-sensitive input device 88. Mobile device 86 may send data representing the gesture as the second indication of user input, via external network 74 and communication unit 70, to computing device 60 that may process the second indication of user input. Computing device 60 may determine whether the second indication of user input of the particular input type is received within a threshold time duration that is initiated responsive to outputting the root DGE. If the second indication of user input of the particular input type is received within the threshold time duration, computing device 6 may ignore the second indication of user input to refrain from dismissal of the root DGE. If the second indication of user input of the particular input type is not received within the threshold time duration, for example, the second indication of user input is receive after the end time of the threshold time duration, computing device 6 may send data, via communication unit 70 and external network 74, to mobile device 86, that causes mobile device 86 to dismiss all of the plurality of DGE's in the plurality of DGE's that includes the root DGE.

Figure 4B:
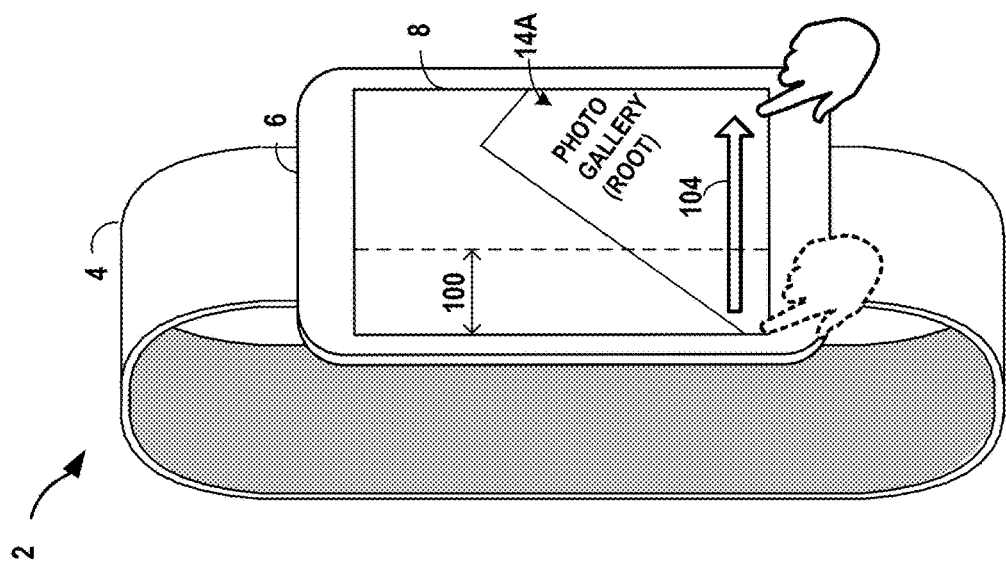
FIGS. 4A-4B are conceptual diagrams illustrating an example computing device that determines one or more characteristics of a user input to prevent accidental dismissal of discrete graphical elements that are output for display, in accordance with one or more aspects of the present disclosure.
Figure 4A:
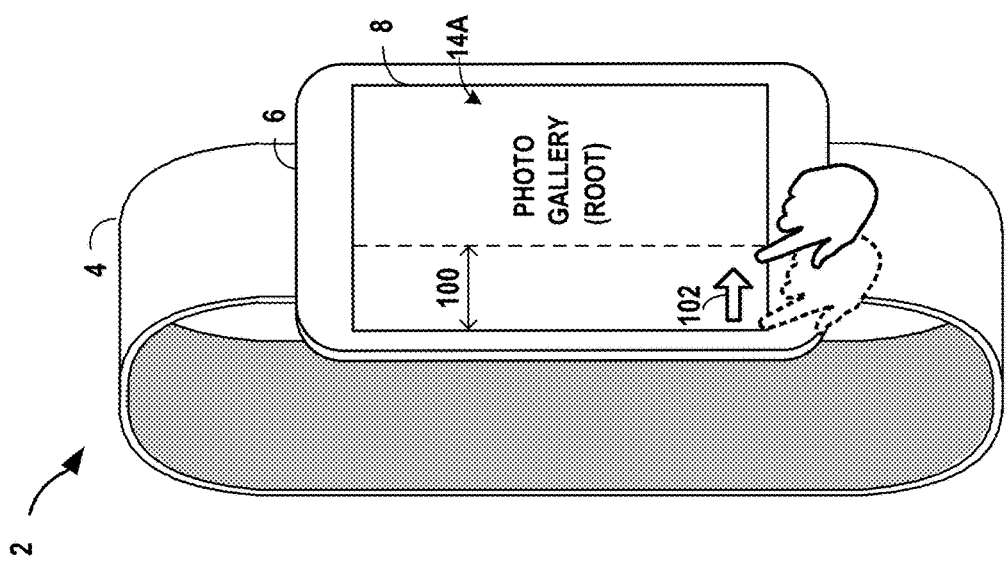

FIGS. 4A-4B are conceptual diagrams illustrating computing device 6 that determines one or more characteristics of a user input to prevent accidental dismissal of discrete graphical elements that are output for display, in accordance with one or more aspects of the present disclosure. As described in FIG. 1, computing device 6 may determine whether to ignore indications of user input in order to refrain from dismissing a root discrete graphical element based on one or more characteristics of the user input. A characteristic of a user input, generally, may be any property of the user input that is determinable by computing device 6. Characteristics of the gesture may include but are not limited to the following: speed, direction, continuity, acceleration, curvature, duration, interval or spacing between touch events (e.g., time between single- and/or multi-touch gesture), time at which user input occurred, to name only a few examples.

In the examples of FIGS. 4A-4B, computing device 6 outputs root discrete graphical element 14A as described in FIG. 1. In order to determine whether to ignore an indication of user input and refrain from dismissal of root discrete graphical element 14A, computing device 6 may determine whether one or more characteristics of the user input satisfy one or more respective thresholds. A threshold may be a user-defined value or may be a system-defined value that is hardcoded by the application developer.

In FIG. 4A, computing device 6 ignores an indication of user input in order to refrain from dismissal of root discrete graphical element 14A, because the length or distance traveled by an indication of user input is less than a threshold distance 100. Threshold distance 100 may span approximately ⅓ of the total width of user interface device 8, in some examples. In other examples, threshold distance 100 may be ½ or ⅔ of the total width of user interface device 8. In some examples, threshold distance 100 may be any proportion of the total width of user interface device 8.

Responsive to receiving an indication of user input 102, computing device 6 may determine one or more characteristics of user input 102. User input 102 may be a horizontal swipe gesture from left to right across user interface device 8 as illustrated in FIG. 4A. Computing device 6 may determine a distance that user input 102 traverses across user interface device 8. Computing device 6 may determine whether the characteristic satisfies a threshold. For instance, computing device 6 may determine whether the distance of user input 102 satisfies the threshold distance 100. In some examples, computing device 6 may compare the distance of user input 102 to threshold distance 100 to determine whether threshold distance 100 is satisfied. If the distance of user input 102 is less than threshold distance 100, computing device 6 may determine that threshold distance 100 is not satisfied. If the distance of user input 102 is greater than or equal to threshold distance 100, computing device 6 may determine that threshold distance 100 is satisfied.

In FIG. 4A, computing device 6 determines that the distance of user input 102 is less than threshold distance 100. Computing device 6 therefore ignores user input 102 to refrain from dismissing root discrete graphical element 14A. That is, responsive to determining that the at least one characteristic does not satisfy the threshold, computing device 6 ignores the indication of user input and refrains from dismissing the root discrete graphical element. Therefore, computing device 6 continues to output for display discrete graphical element 14A. In this way, by determining that the distance of user input 102 does not satisfy the threshold and ignore user input 102, computing device 6 will prevent the user from accidentally dismissing root discrete graphical element 14A, and thereby prevent dismissal of all of the discrete graphical elements in the same group as root discrete graphical element 14A.

In FIG. 4B, computing device 6 dismisses root discrete graphical element 14A, because the length or distance traveled by an indication of user input is greater than threshold distance 100. Responsive to receiving an indication of user input 104, computing device 6 may determine one or more characteristics of user input 104. User input 104 may also be a horizontal swipe gesture from left to right across user interface device 8 as illustrated in FIG. 4B. Computing device 6 may determine a distance that user input 104 traverses across user interface device 8. Computing device 6 may determine whether the distance of user input 104 satisfies the threshold distance 100.

In FIG. 4B, computing device 6 determines that the distance of user input 104 is greater than threshold distance 100. Computing device 6 therefore dismisses root discrete graphical element 14A. As shown in FIG. 4B, computing device 6 may display an animation that simulates root discrete graphical element 14A falling off user interface device 8. Consequently, all of the discrete graphical elements in the group of discrete graphical elements that includes root discrete graphical element 14A are dismissed. In this way, by determining that the distance of user input 102 satisfies the threshold, computing device 6 will dismiss root discrete graphical element 14A when it is clear that dismissing root discrete graphical element 14A is the user's intent because the threshold is satisfied.

In some examples, computing device 6 may determine a velocity of the user input, which computing device 6 may use to determine whether to ignore the user input. For instance, responsive to receiving an indication of user input, computing device 6 may determine a particular velocity that the user input traverses across user interface device 8. Computing device 6 may determine whether the particular distance of the user input satisfies a threshold velocity. In some examples, the threshold velocity may be a minimum velocity, and computing device 6 will ignore the user input if the user input does not have a velocity that is greater than the threshold velocity. In some examples, the threshold velocity may be a maximum velocity, and computing device will ignore the user input if the user input does not have a velocity that is less than the threshold velocity.

In the current example, if computing device 6 determines that the particular velocity of the user input is less than the threshold velocity, computing device 6 may ignore the user input. If, however, computing device 6 determines that the velocity of the user input is greater than the threshold velocity, computing device 6 may dismiss root discrete graphical element 14A. Consequently, all of the discrete graphical elements in the group of discrete graphical elements that includes root discrete graphical element 14A are dismissed. In this way, by determining that the particular velocity of the user input satisfies the threshold velocity, computing device 6 will dismiss root discrete graphical element 14A, along with all of the discrete graphical elements in the same group, when it is clear that dismissing root discrete graphical element 14A is the user's intent because the threshold is satisfied.

Although techniques of the disclosure have been described with respect to distance and velocity of a user input, computing device 6 may use any number of one or more characteristics of the user input to determine whether to ignore the user input. For instance, computing device 6 may ignore a user input unless each of multiple thresholds for different respective characteristics are satisfied. As an example, computing device 6 may ignore a user input if the user input occurs after a threshold time duration expires, but the velocity does not satisfy a threshold velocity. As another example, computing device 6 may ignore a user input if the velocity of the user input satisfies a threshold velocity, but a distance of the user input does not satisfy a threshold distance.

In some examples, computing device 6 may not ignore a user input if at least a subset of multiple thresholds for different respective characteristics are satisfied. For instance, computing device 6 may include a threshold time duration, distance threshold, and velocity threshold, as described in this disclosure. If computing device 6 determines that at least a subset (e.g., 1 or 2) of thresholds of the multiple thresholds (e.g., 3 total) are satisfied, computing device 6 may not ignore the user input. For instance, if computing device 6 determines that both the velocity and distance thresholds are satisfied for a particular user input, but the threshold time duration is not satisfied (e.g., the user input is received before the threshold time duration expires), computing device 6 may not ignore the user input and may perform one or more operations associated with the user input. Finally, computing device 6 may apply any of the aforementioned thresholds separately or in combination to determine whether to ignore a user input.

Figure 5:
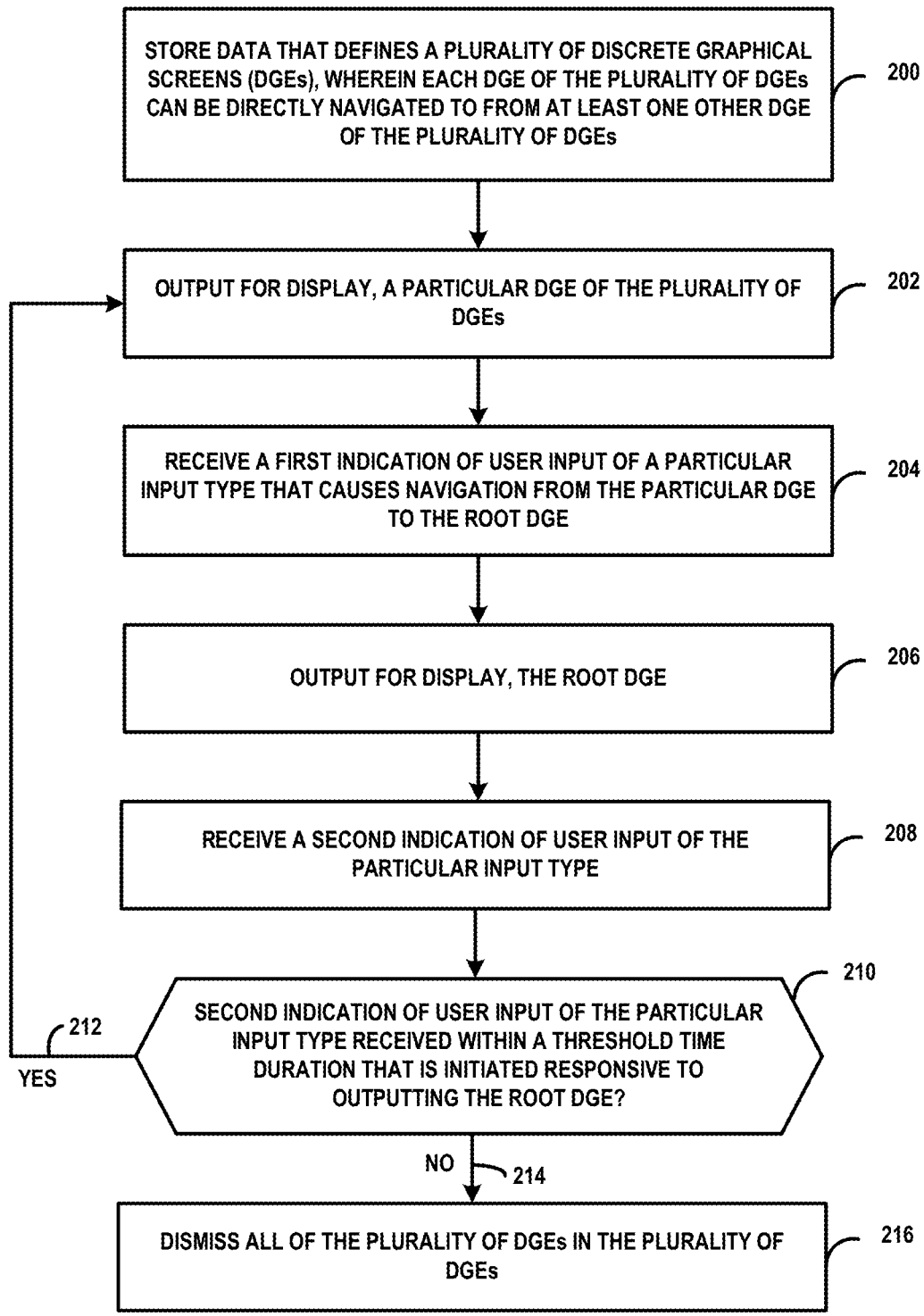
FIG. 5 is a flow diagram illustrating example operations of a computing device that implements techniques for preventing accidental dismissal of discrete graphical elements that are output for display, in accordance with one or more aspects of the present disclosure.

FIG. 5 is a flow diagram illustrating example operations of a computing device that implements techniques for preventing accidental dismissal of discrete graphical elements that are output for display, in accordance with one or more aspects of the present disclosure. For purposes of illustration only, the example operations are described below within the context of computing device 6, as shown in FIGS. 1 and 2. In some examples, input module 12 and/or display module 10 may perform the techniques of FIG. 5.

Computing device 6 may store data that defines a plurality of discrete graphical elements (DGE's) (200). Each DGE of the plurality of DGE's may be directly navigated to from at least one other DGE of the plurality of DGE's. The plurality of DGE's may include at least one root DGE, and dismissal of the root DGE may cause dismissal of all of the plurality of DGE's. Computing device 6 may output for display at a display device, a particular DGE of the plurality of DGE's (202). In some examples, computing device 6 may receive a first indication of user input of a particular input type that causes navigation from the particular DGE to the root DGE (204). Computing device 6 may output for display, the root DGE (206).

In some examples, computing device 6 may receive a second indication of user input of the particular input type (208). Computing device 6 may determine whether the second indication of user input of the particular input type is received within a threshold time duration that is initiated responsive to outputting the root DGE (210). If the second indication of user input of the particular input type is received within the threshold time duration (212), computing device 6 may ignore the second indication of user input to refrain from dismissal of the root DGE. If the second indication of user input of the particular input type is not received within the threshold time duration (212), for example, the second indication of user input is receive after the end time of the threshold time duration, computing device 6 may dismiss all of the plurality of DGE's in the plurality of DGE's that includes the root DGE.

Example 1

A method comprising: storing, by a computing device, data that defines a plurality of discrete graphical elements (DGE's), wherein each DGE of the plurality of DGE's can be directly navigated to from at least one other DGE of the plurality of DGE's, wherein the plurality of DGE's includes at least one root DGE, and wherein dismissal of the root DGE causes dismissal of all of the plurality of DGE's; outputting, by the computing device and for display at a display device, a particular DGE of the plurality of DGE's; responsive to receiving a first indication of user input of a particular input type that causes navigation from the particular DGE to the root DGE, outputting, by the computing device and for display, the root DGE; and responsive to receiving a second indication of user input of the particular input type within a threshold time duration that is initiated responsive to outputting the root DGE, ignoring the second indication of user input to refrain from dismissal of the root DGE.

Example 2

The method of Example 1, further comprising: responsive to receiving, after the first indication of user input, a third indication of input of the particular input type that is not within the threshold time duration, dismissing all of the plurality of DGE's.

Example 3

The method of any of Examples 1-2, further comprising: responsive to outputting for display the root DGE, starting a timer that includes a start time and an end time; and wherein the threshold time duration is equal to a difference of time between the start time and the end time, and wherein the second indication of user input of the particular input type occurs between the start time and the end time.

Example 4

The method of any of Examples 1-3, wherein a user input of the particular input type: causes the computing device to navigate from a currently displayed DGE to another DGE within the plurality of DGE's if the currently displayed DGE is not the root DGE, and causes the computing device to dismiss the root DGE if the currently displayed DGE is the root DGE and the user input of the particular input type is not received by the computing device within the threshold time duration.

Example 5

The method of any of Examples 1-4, further comprising: determining, by the computing device, at least one characteristic of a third indication of user input; determining, by the computing device, whether the at least one characteristic satisfies a threshold; and responsive to determining, by the computing device, that the at least one characteristic does not satisfy the threshold, ignoring the third indication of user input to refrain from dismissal of the root DGE.

Example 6

The method of any of Examples 1-5, wherein the at least one characteristic is at least one of a speed, a direction, a continuity, an acceleration, a curvature, a duration, an interval of the user input, or a time at which user input occurred.

Example 7

The method of any of Examples 1-6, wherein navigating from a first DGE to a second DGE causes the computing device to maintain data that represents a state of the first DGE and remove the first DGE from display, and wherein dismissal of the second DGE causes the computing device to programmatically destroy the DGE.

Example 8

The method of any of Examples 1-7, further comprising: determining, by the computing device, a quantity of user inputs received by the computing device; determining, by the computing device, whether the quantity of user inputs satisfies a threshold quantity; and wherein ignoring the second indication of user input to refrain from dismissal of the root DGE further comprises ignoring the second indication of user input to refrain from dismissal of the root DGE responsive to determining that the quantity of user inputs satisfies a threshold quantity.

Example 9

The method of any of Examples 1-8, wherein the threshold time duration is a first threshold time duration, the method further comprising: determining, by the computing device, whether the quantity of user inputs satisfies the threshold quantity within a second threshold time duration; and wherein ignoring the second indication of user input to refrain from dismissal of the root DGE further comprises ignoring the second indication of user input to refrain from dismissal of the root DGE responsive to determining that the quantity of user inputs satisfies the threshold quantity within the second threshold time duration.

Example 10

The method of any of Examples 1-9, wherein the first indication of user input of the particular input type comprises a first linear gesture in a direction towards a first edge of a presence-sensitive input device, the linear gesture being substantially parallel to a second edge of the presence-sensitive input device that is orthogonal to the first edge, and wherein the second indication of user input of the particular input type comprises a second linear gesture in the direction towards the first edge of the presence-sensitive input device, the second linear gesture being substantially parallel to the second edge of the presence-sensitive input device that is orthogonal to the first edge.

Example 11

The method of any of Examples 1-10, wherein the particular input type is a first input type, wherein a third indication of user input of a second input type comprises a third linear gesture in a first direction that is opposite to a second direction towards the first edge of the presence-sensitive input device, the third linear gesture being substantially parallel to the second edge of the presence-sensitive input device that is orthogonal to the first edge.

Example 12

A computing device comprising: at least one processor; a display device; and at least one module, operable by the at least one processor to: store data that defines a plurality of discrete graphical elements (DGE's), wherein each DGE of the plurality of DGE's can be directly navigated to from at least one other DGE of the plurality of DGE's, wherein the plurality of DGE's includes at least one root DGE, and wherein dismissal of the root DGE causes dismissal of all of the plurality of DGE's; output, for display at the display device, a particular DGE of the plurality of DGE's; output, for display, the root DGE, responsive to receiving a first indication of user input of a particular input type that causes navigation from the particular DGE to the root DGE; and ignore a second indication of user input to refrain from dismissal of the root DGE, responsive to receiving the second indication of user input of the particular input type within a threshold time duration that is initiated responsive to outputting the root DGE.

Example 13

The computing device of Example 12, wherein the at least one module is operable by the at least one processor to: dismiss all of the plurality of DGE's, responsive to receiving, after the first indication of user input, a third indication of input of the particular input type that is not within the threshold time duration.

Example 14

The computing device of any of Examples 12-13, wherein the at least one module is operable by the at least one processor to: responsive to outputting for display the root DGE, starting a timer that includes a start time and an end time; and wherein the threshold time duration is equal to a difference of time between the start time and the end time, and wherein the second indication of user input of the particular input type occurs between the start time and the end time.

Example 15

The computing device of any of Examples 12-14, wherein a user input of the particular input type: causes the computing device to navigate from a currently displayed DGE to another DGE within the plurality of DGE's if the currently displayed DGE is not the root DGE, and causes the computing device to dismiss the root DGE if the currently displayed DGE is the root DGE and the user input of the particular input type is not received by the computing device within the threshold time duration.

Example 16

The computing device of any of Examples 12-15, wherein the at least one module is operable by the at least one processor to: determine at least one characteristic of a third indication of user input; determine whether the at least one characteristic satisfies a threshold; and ignore the third indication of user input to refrain from dismissal of the root DGE, responsive to determining that the at least one characteristic does not satisfy the threshold.

Example 17

A non-transitory computer-readable storage medium encoded with instructions that, when executed, cause at least one processor of a computing device to: store data that defines a plurality of discrete graphical elements (DGE's), wherein each DGE of the plurality of DGE's can be directly navigated to from at least one other DGE of the plurality of DGE's, wherein the plurality of DGE's includes at least one root DGE, and wherein dismissal of the root DGE causes dismissal of all of the plurality of DGE's; output, for display at a display device, a particular DGE of the plurality of DGE's; output, for display, the root DGE, responsive to receiving a first indication of user input of a particular input type that causes navigation from the particular DGE to the root DGE; and ignore a second indication of user input to refrain from dismissal of the root DGE, responsive to receiving the second indication of user input of the particular input type within a threshold time duration that is initiated responsive to outputting the root DGE.

Example 18

The non-transitory computer-readable storage medium of Example 17, further comprising instructions that, when executed, cause at least one processor to: dismiss all of the plurality of DGE's, responsive to receiving, after the first indication of user input, a third indication of input of the particular input type that is not within the threshold time duration.

Example 19

The non-transitory computer-readable storage medium of any of Examples claim 17-18, further comprising instructions that, when executed, cause at least one processor to: responsive to outputting for display the root DGE, starting a timer that includes a start time and an end time; and wherein the threshold time duration is equal to a difference of time between the start time and the end time, and wherein the second indication of user input of the particular input type occurs between the start time and the end time.

Example 20

The non-transitory computer-readable storage medium of any of Examples 17-19, wherein a user input of the particular input type: causes the computing device to navigate from a currently displayed DGE to another DGE within the plurality of DGE's if the currently displayed DGE is not the root DGE, and causes the computing device to dismiss the root DGE if the currently displayed DGE is the root DGE and the user input of the particular input type is not received by the computing device within the threshold time duration.

Example 21

An apparatus comprising: means for storing data that defines a plurality of discrete graphical elements (DGE's), wherein the computing device provides, for each respective DGE of the plurality of DGE's, direct navigation from the respective DGE to at least one other respective DGE of the plurality of DGE's, wherein the plurality of DGE's includes at least one root DGE, and wherein the computing device dismisses all of the plurality of DGE's in response to dismissing the root DGE; means for outputting for display at a display device operatively coupled to the computing device, a particular DGE of the plurality of DGE's; means for responsive to receiving a first indication of user input of a particular input type that causes the computing device to navigate from the particular DGE to the root DGE, outputting, for display at a display device, the root DGE; and means for responsive to receiving a second indication of user input of the particular input type within a threshold time duration that is initiated responsive to outputting the root DGE, refraining from dismissing the root DGE.

Example 22

The apparatus of Example 21, comprising means for performing the method of any of Examples 2-11.

Example 23

The Example of claim 1, further comprising: responsive to receiving, after the second indication of user input, a third indication of input of the particular input type that is within the threshold time duration, dismissing all of the plurality of DGE's.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   outputting, by a computing device and for display at a display device operatively coupled to the computing device, a particular discrete graphical element from a plurality of discrete graphical elements, wherein the plurality of discrete graphical elements includes at least one group of discrete graphical elements including a root discrete graphical element and one or more other discrete graphical elements;
   responsive to receiving an indication of a first user input of a particular input type, outputting, by the computing device and for display at the display device, the root discrete graphical element;
   receiving, by the computing device, an indication of a second user input of the particular input type after receiving the first indication of the user input of the particular input type;
   responsive to receiving the indication of the second user input within a threshold time duration from when the root discrete graphical element was output, refraining from dismissing the root discrete graphical element; and
   responsive to receiving the indication of the second user input outside of the threshold time duration, dismissing the root discrete graphical element.

2. The method of claim 1, further comprising:
   responsive to receiving, after the first user input and not within the threshold time duration, an indication of a third user input of the particular input type, dismissing all of the group of discrete graphical elements.

3. The method of claim 1, further comprising:
   responsive to receiving, after the second user input and within the threshold time duration, an indication of a third user input of the particular input type, dismissing all of the group of discrete graphical elements.

4. The method of claim 1, further comprising:
   responsive to outputting the root discrete graphical element, initiating a timer having a start time and an end time, wherein the threshold time duration is equal to a difference of time between the start time and the end time.

5. The method of claim 1, further comprising:
determining, by the computing device and based on the indication of the second user input, at least one characteristic of the second user input;
determining, by the computing device, whether the at least one characteristic satisfies a threshold,
wherein refraining from dismissing the root discrete graphical element is further responsive to determining that the at least one characteristic does not satisfy the threshold.

6. The method of claim 5, wherein the at least one characteristic of the second user input is at least one of a speed of the second user input, a direction of the second user input, a continuity of the second user input, an acceleration of the second user input, a curvature of the second user input, or a duration of the second user input.

7. The method of claim 1, further comprising:
responsive to navigating from a first discrete graphical element from the plurality of discrete graphical elements to a second discrete graphical element from the plurality of discrete graphical elements:
maintaining, by the computing device, data that represents a state of the first discrete graphical element; and
removing the first discrete graphical element from display.

8. The method of claim 1, further comprising:
determining, by the computing device, a quantity of user inputs received by the computing device within particular time duration; and
determining, by the computing device, whether the quantity of user inputs satisfies a threshold quantity,
wherein refraining from dismissing the root discrete graphical element is further responsive to determining that the quantity of user inputs satisfies the threshold quantity.

9. The method of claim 8, wherein the particular time duration is a first particular time duration, the method further comprising:
determining, by the computing device, whether the quantity of user inputs satisfies the threshold quantity within a second particular time duration,
wherein refraining from dismissing the root discrete graphical element is further responsive to determining that the quantity of user inputs satisfies the threshold quantity within the second particular time duration.

10. The method of claim 1,
wherein the first user input of the particular input type comprises a first linear gesture in a direction towards a first edge of a presence-sensitive input device, the linear gesture being substantially parallel to a second edge of the presence-sensitive input device that is orthogonal to the first edge, and
wherein the second user input of the particular input type comprises a second linear gesture in the direction towards the first edge of the presence-sensitive input device, the second linear gesture being substantially parallel to the second edge of the presence-sensitive input device that is orthogonal to the first edge.

11. A computing device comprising:
at least one processor;
a presence-sensitive display device that detects a first user input of a particular type and, after detecting the first user input, detects a second user input of the particular type; and
a storage device that stores at least one module that is operable by the at least one processor to:
output, for display at the presence-sensitive display device, a particular discrete graphical element from a plurality of discrete graphical elements, wherein the plurality of discrete graphical elements includes at least one group of discrete graphical elements including a root discrete graphical element and one or more other discrete graphical elements;
responsive to detecting the first user input of the particular input output, for display by the presence-sensitive display device, the root discrete graphical element;
responsive to detecting the second user input within a threshold time duration from when the root discrete graphical element was output, refrain from dismissing the root discrete graphical element; and
responsive to detecting the second user input outside of the threshold time duration, dismissing the root discrete graphical element.

12. The computing device of claim 11, wherein the at least one module is further operable by the at least one processor to:
responsive to the presence-sensitive display device detecting a third user input after the first user input and not within the threshold time duration, dismiss all of the group of discrete graphical elements.

13. The computing device of claim 11, wherein the at least one module is further operable by the at least one processor to:
responsive to the presence-sensitive display device detecting a third user input after the second user input and within the threshold time duration, dismiss all of the group of discrete graphical elements.

14. The computing device of claim 11, wherein the at least one module is further operable by the at least one processor to:
responsive to outputting the root discrete graphical element, initiate a timer having a start time and an end time, wherein the threshold time duration is equal to a difference of time between the start time and the end time.

15. The computing device of claim 11, wherein the at least one module is further operable by the at least one processor to:
determine, based on the second user input, at least one characteristic of the second user input;
determine whether the at least one characteristic satisfies a threshold,
wherein the at least one module is operable by the at least one processors to refrain from dismissing the root discrete graphical element further responsive to determining that the at least one characteristic does not satisfy the threshold.

16. The computing device of claim 15, wherein the at least one characteristic of the second user input is at least one of a speed of the second user input, a direction of the second user input, a continuity of the second user input, an acceleration of the second user input, a curvature of the second user input, or a duration of the second user input.

17. The computing device of claim 13, wherein the at least one module is further operable by the at least one processor to:
responsive to navigating from a first discrete graphical element from the plurality of discrete graphical elements to a second discrete graphical element from the plurality of discrete graphical elements:
maintain data that represents a state of the first discrete graphical element; and remove the first discrete graphical element from display.

18. A non-transitory computer-readable storage medium encoded with instructions that, when executed, cause at least one processor of a computing device to:
- output, for display at a display device operatively coupled to the computing device, a particular discrete graphical element from a plurality of discrete graphical elements, wherein the plurality of discrete graphical elements includes at least one group of discrete graphical elements including a root discrete graphical element and one or more other discrete graphical elements;
- responsive to receiving an indication of a first user input of a particular input type, output, for display at the display device, the root discrete graphical element;
- receive an indication of a second user input of the particular input type after receiving the first indication of the user input of the particular input type;
- responsive to receiving the indication of the second user input within a threshold time duration from when the root discrete graphical element was output, refrain from dismissing the root discrete graphical element; and
- responsive to receiving the indication of the second user input outside of the threshold time duration, dismiss the root discrete graphical element.

19. The non-transitory computer-readable storage medium of claim 18, further comprising instructions that, when executed, cause at least one processor to:
- responsive to receiving, after the first user input and not within the threshold time duration, an indication of a third user input of the particular input type, dismiss all of the group of discrete graphical elements.

20. The non-transitory computer-readable storage medium of claim 18, further comprising instructions that, when executed, cause at least one processor to:
- responsive to receiving, after the second user input and within the threshold time duration, an indication of a third user input of the particular input type, dismiss all of the group of discrete graphical elements.

* * * * *